US010670113B2

United States Patent
Yoon et al.

(10) Patent No.: US 10,670,113 B2
(45) Date of Patent: Jun. 2, 2020

(54) ROBOT ARM MECHANISM

(71) Applicant: LIFE ROBOTICS INC., Tokyo (JP)

(72) Inventors: Woo-Keun Yoon, Tokyo (JP); Hiroaki Matsuda, Tokyo (JP)

(73) Assignee: LIFE ROBOTICS INC., Tokyo (JP)

( * ) Notice: Subject to any disclaimer, the term of this patent is extended or adjusted under 35 U.S.C. 154(b) by 24 days.

(21) Appl. No.: 16/243,843

(22) Filed: Jan. 9, 2019

(65) Prior Publication Data

US 2019/0145498 A1    May 16, 2019

Related U.S. Application Data

(63) Continuation of application No. PCT/JP2017/027108, filed on Jul. 26, 2017.

(30) Foreign Application Priority Data

Jul. 30, 2016    (JP) .................................. 2016-150881

(51) Int. Cl.
*B25J 18/02* (2006.01)
*F16G 13/20* (2006.01)
(Continued)

(52) U.S. Cl.
CPC ............ *F16G 13/20* (2013.01); *B25J 9/0009* (2013.01); *B25J 18/02* (2013.01); *F16H 19/0636* (2013.01); *F16H 19/0663* (2013.01)

(58) Field of Classification Search
CPC ......... F16G 13/20; B25J 9/0009; B25J 18/02; F16H 19/0636
See application file for complete search history.

(56) References Cited

U.S. PATENT DOCUMENTS 5,970,701 A * 10/1999 Roden ..................... F16G 13/20
59/78
10,005,189 B2 * 6/2018 Yoon ..................... B25J 18/025
(Continued)

FOREIGN PATENT DOCUMENTS

JP    H5-277982 A    10/1993
JP    H6-17891 U    3/1994
(Continued)

OTHER PUBLICATIONS

International Search Report issued in PCT/JP20171027108 dated Sep. 12, 2017 with English Translation (5 pages).

*Primary Examiner* — David M Fenstermacher
(74) *Attorney, Agent, or Firm* — Nakanishi IP Associates, LLC

(57) ABSTRACT

A robot arm mechanism is capable of preventing a first piece string from colliding with a support column inner wall in the robot arm mechanism having a linear extension and retraction joint. The robot arm mechanism includes a plurality of first pieces that are connected in a string shape and a plurality of second pieces that are connected in a string shape, a feed mechanism section that supports the first and second strings movably forward and backward, a storage section in a square cylinder shape that stores the first pieces and the second pieces, and a guide that guides reciprocating movement of the first pieces between the feed mechanism section and the storage section from outside of the first pieces. The guide has a plurality of guide pieces that are connected bendably in mutual front and rear end surfaces to deform in accordance with rising and lowering movement of a rising and lowering rotation joint, and the guide hangs into the storage section from a tip position where the guide is fixed to the feed mechanism section.

10 Claims, 10 Drawing Sheets

(51) Int. Cl.
*B25J 9/00* (2006.01)
*F16H 19/06* (2006.01)

(56) References Cited

U.S. PATENT DOCUMENTS

| | | | |
|---|---|---|---|
| 10,131,058 B2 * | 11/2018 | Yoon | F16G 13/20 |
| 10,335,943 B2 * | 7/2019 | Yoon | B25J 9/06 |
| 10,406,697 B2 * | 9/2019 | Yoon | B25J 18/02 |
| 2012/0024091 A1 * | 2/2012 | Kawabuchi | B25J 9/045 74/37 |
| 2013/0068061 A1 * | 3/2013 | Yoon | B25J 18/025 74/490.05 |
| 2015/0343648 A1 | 12/2015 | Yoon | |
| 2017/0266819 A1 * | 9/2017 | Yoon | F16H 19/02 |
| 2018/0207812 A1 * | 7/2018 | Yoon | B25J 18/02 |
| 2018/0370049 A1 * | 12/2018 | Yoon | B25J 9/047 |

FOREIGN PATENT DOCUMENTS

| | | |
|---|---|---|
| JP | 5435679 B | 3/2014 |
| JP | 2016-132053 A | 7/2016 |
| WO | 2011/152265 A1 | 12/2011 |

\* cited by examiner

ROBOT ARM MECHANISM

CROSS-REFERENCE TO RELATED APPLICATIONS

This application is a continuation application of International Patent Application No. PCT/JP2017/027108 filed on Jul. 26, 2017, which is based upon and claims the benefit of priority from the prior Japanese Patent Application No. 2016-150881, filed Jul. 30, 2016 the entire contents of which are incorporated herein by reference.

FIELD

Embodiments described herein relate generally to a robot arm mechanism.

BACKGROUND

Conventionally, an articulated robot arm mechanism has been used in various fields such as an industrial robot. The inventors have developed a linear extension and retraction mechanism that can be applied to an articulated robot arm mechanism like this (Patent Literature 1). The linear extension and retraction mechanism has a first and a second piece strings. The first piece string is formed by connecting a plurality of metallic pieces (first pieces) that have a flat plate shape and are bendably connected to one another with a hinge structure, in a string shape. The second piece string is formed by connecting a plurality of metallic pieces (second pieces) that have a groove frame shape and are bendably connected to one another with a bearing structure in bottom plates, in a string shape. Leading pieces of the first and the second piece strings are connected at tips, and when the first and the second piece strings are fed out forward, the first and the second piece strings are overlapped with each other with a roller unit, have a rigid state secured, and are configured to be a columnar arm having fixed rigidity. When the first and the second piece strings are pulled backward, the first and the second piece strings are separated behind the roller unit, return to a bendable state respectively, and are stored in a storage section inside a support column. Adoption of the linear extension and retraction mechanism to an articulated robot arm mechanism makes an elbow joint section unnecessary, and can easily eliminate a singular point, which makes it a very useful mechanism. Therefore, the linear extension and retraction mechanism can be combined with various joints such as a rising and lowering rotation joint and a turning rotation joint. For example, when a rising and lowering rotation joint is installed directly before the linear extension and retraction mechanism, a positional relationship between the roller unit of the linear extension and retraction mechanism, and the storage section storing the first and the second piece strings changes in accordance with rising and lowering movement of the rising and lowering rotation joint which is interposed between the roller unit and the storage section, and a space between the roller unit and the storage section also changes in width.

The first and the second piece strings repeat reciprocating movement between the storage section and the roller unit. If the space between the roller unit and the storage section is large, there is a possibility that the first and the second pieces deviate from a planned trajectory, and collide with surrounding components, in the process of the reciprocating movement of the first and the second piece strings. Collision of the first and the second pieces with the components not only breaks the components but also could damage the first and the second pieces. Further, as a result that the first and the second piece strings deviate from the planned trajectory, smooth feeding/and pulling-back operation of the arm is likely to be inhibited. In order to reduce these risks, it is necessary to install a mechanism that guides the first and the second pieces, in the space between the storage section and the roller unit.

CITATION LIST

Patent Literature

Patent Literature 1: Specification of Japanese Patent No. 5435679

SUMMARY

An object is to provide a mechanism that guides first pieces, between a roller unit and a storage section, in a robot arm mechanism having a linear extension and retraction joint.

Solution to Problem

According to one aspect of the present disclosure, there is provided a robot arm mechanism comprising a support column section supported by a base, a rising and lowering section including a rising and lowering rotation joint placed on the support column section, and a linear extension and retraction mechanism including an arm with linear extension and retraction properties provided in the rising and lowering section. The robot arm mechanism comprises a plurality of first pieces each in a flat plate shape that are bendably connected, a plurality of second pieces each in a groove frame shape that are bendably connected, a head section that connects a head of the first pieces and a head of the second pieces, a feed mechanism section that supports the first and second pieces movably forward and backward, a storage section in a square cylinder shape that is installed in the support column section, and stores the first pieces and the second pieces that are separated, and a guide that guides reciprocating movement of the first pieces between the feed mechanism and the storage section from outside of the first pieces. When the arm extends forward, the first and the second pieces are pulled out to the feed mechanism section from the storage section and are overlapped with each other in the feed mechanism section to configure the arm rigidly, and when the arm retracts, the first and the second pieces are pulled back to behind the feed mechanism section and are separated from each other to be returned, in a bending state, to the storage section from the feed mechanism section, and the guide includes a plurality of guide pieces bendably connected in mutual front and rear end surfaces to deform in accordance with rising and lowering movement of the rising and lowering rotation joint, and hangs into the storage section from a tip position where the guide is fixed to the feed mechanism section.

DETAILED DESCRIPTION

Hereinafter, a robot arm mechanism according to the present embodiment will be described with reference to the drawings. In the following explanation, components having substantially same functions and configurations will be assigned with the same reference signs, and redundant explanation will be made only when necessary.

Figure 1:
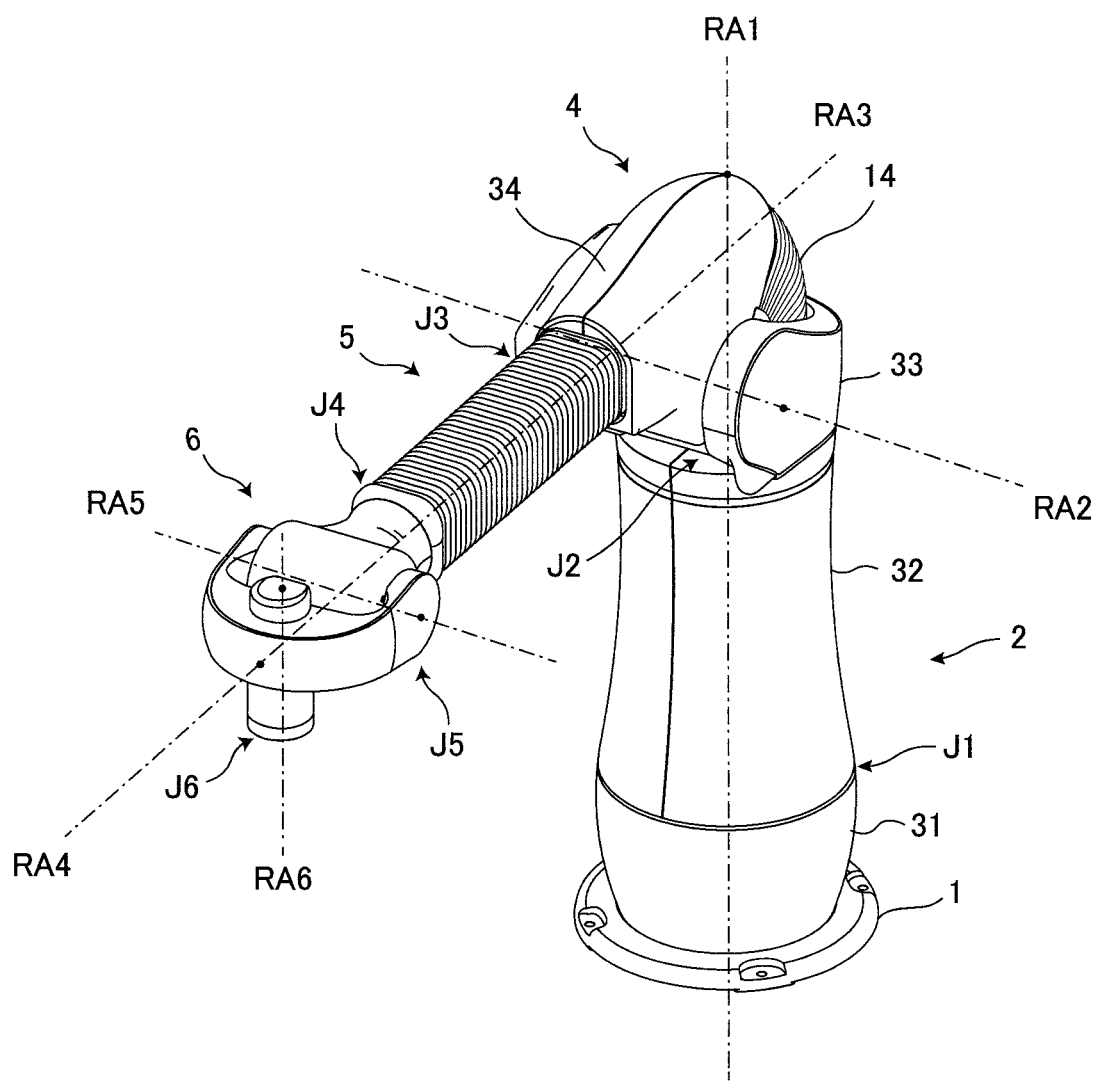
FIG. 1 is a perspective view of a robot arm mechanism according to the present embodiment.
Figure 2:
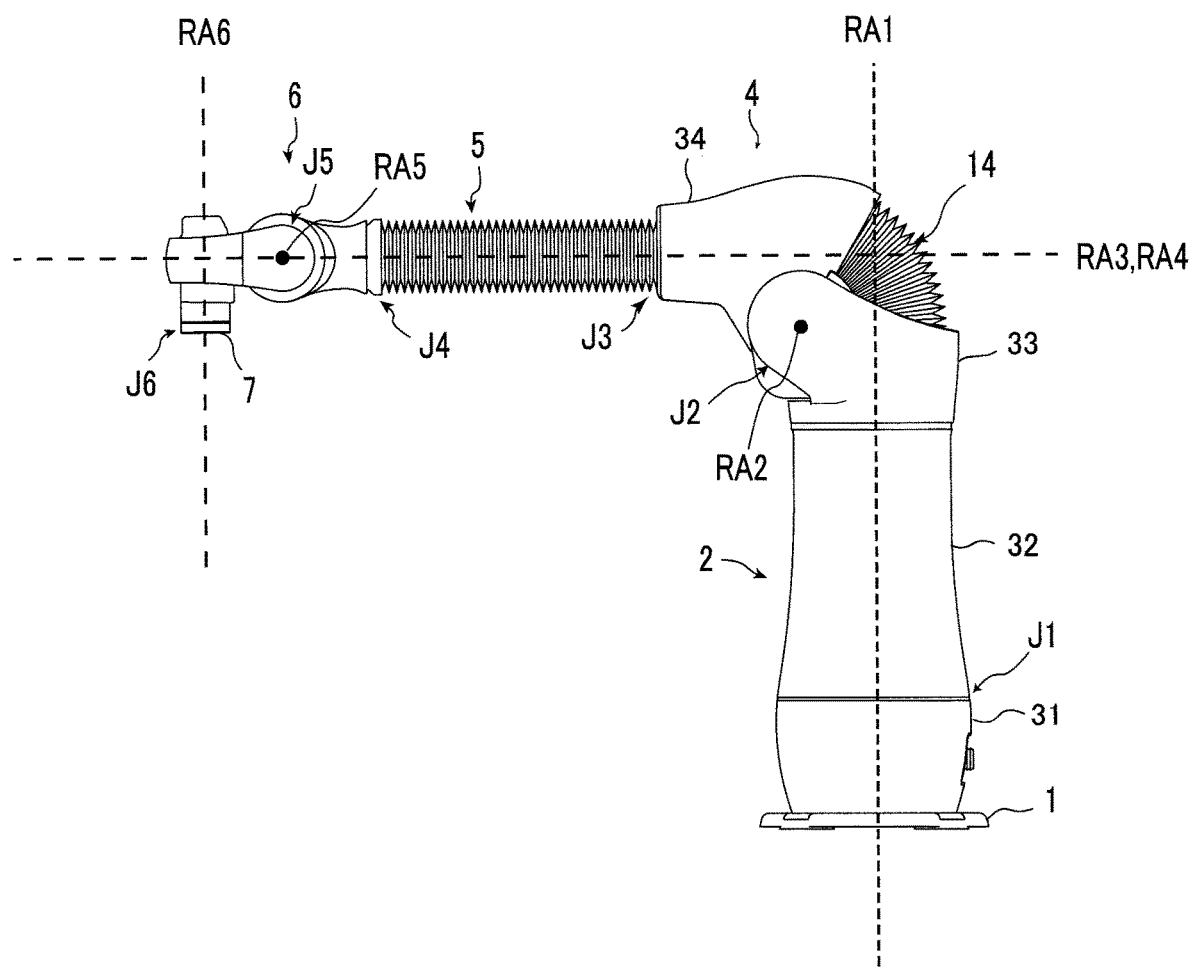
FIG. 2 is a side view of the robot arm mechanism in FIG. 1.
Figure 3:
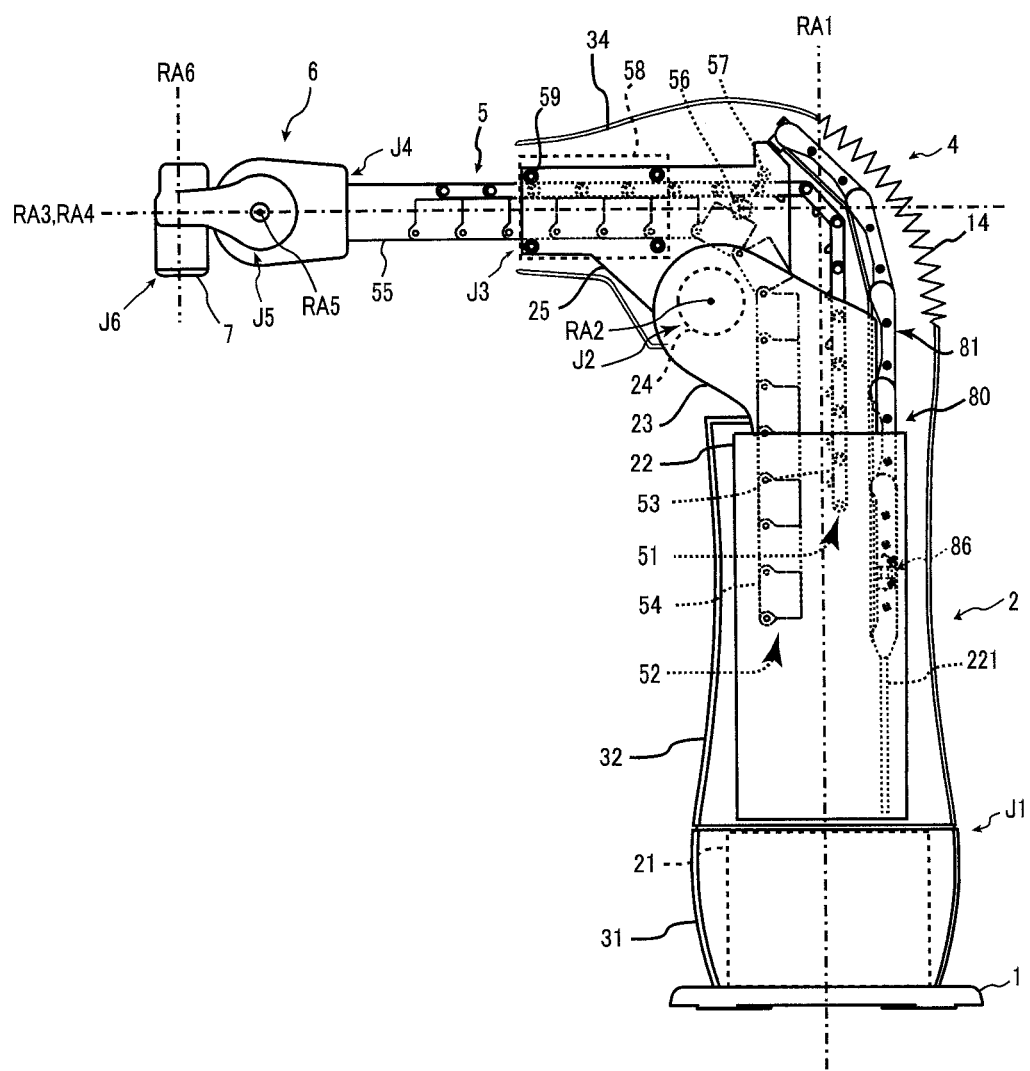
FIG. 3 is a side view illustrating an internal structure of the robot arm mechanism in FIG. 1.
Figure 4:
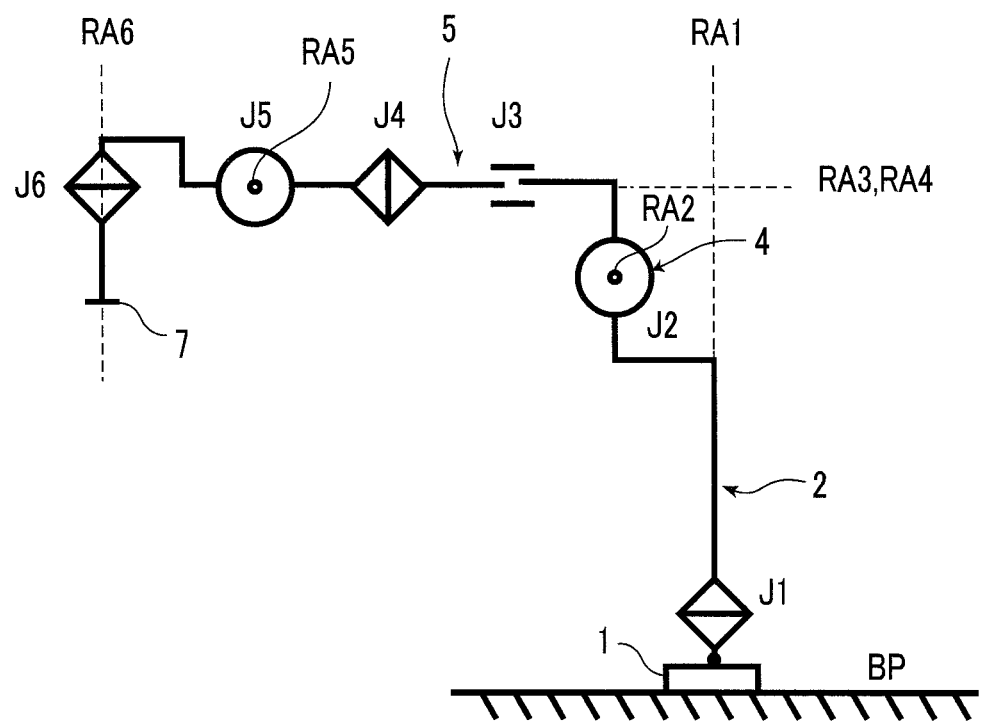
FIG. 4 is a diagram illustrating a configuration of the robot arm mechanism in FIG. 1 by graphic symbol expression.

FIG. 1 illustrates an external view of the robot arm mechanism according to the present embodiment. FIG. 2 illustrates a side view of the robot arm mechanism in FIG. 1. FIG. 3 is a view illustrating an internal structure of the robot arm mechanism in FIG. 1. FIG. 4 is a diagram illustrating a configuration of the robot arm mechanism in FIG. 1 by graphic symbol expression.

In the robot arm mechanism, a support column section 2 is vertically provided on a base 1 in a vertical direction. A rising and lowering section 4 is placed on the support column section 2. A linear extension and retraction mechanism is supported by the rising and lowering section 4 to be capable of rising and lowering. A wrist section 6 is mounted to a tip of an arm section 5 that is extended and retracted by the linear extension and retraction mechanism. In the support column section 2, a first joint J1 as a turning rotation joint is housed across a support column lower frame 21 and a storage section 22. The support column lower frame 21 is covered with a cylindrical housing 31. The storage section 22 is connected to a rotating section of the first joint J1, and axially rotates around an axis of rotation RA1. The storage section 22 is covered with a cylindrical housing 32. With rotation of the first joint J1, the storage section 22 rotates with respect to the support column lower frame 21, and thereby the arm section 5 turns horizontally. In an inner hollow of the support column section 2 forming a cylindrical body, a first and a second piece strings 51 and 52 of a third joint J3 as the linear extension and retraction mechanism that will be described later are stored.

The rising and lowering section 4 that stores a second joint J2 as a rising and lowering rotation joint is installed on an upper portion of the support column section 2. The second joint J2 is a bending rotation joint. An axis of rotation RA2 of the second joint J2 is perpendicular to the axis of rotation RA1. The rising and lowering section 4 has a pair of side frames 23 as a fixing section (support section) of the second joint J2. The pair of side frames 23 are covered with a saddle-shaped housing 33. The pair of side frames 23 are connected to the storage section 22. A cylindrical body 24 as a rotating section of the second joint J2, which is also used as a motor housing, is supported by the pair of side frames 23. A feed mechanism section 25 is attached to a circumferential surface of the cylindrical body 24. The feed mechanism section 25 holds a drive gear 56, a guide roller 57, and a roller unit 58. With axial rotation of the cylindrical body 24, the feed mechanism section 25 rotates, and the arm section 5 that is supported by the feed mechanism section 25 rises and lowers vertically. The feed mechanism section 25 is covered with a housing 34. Between the housings 33 and 34, a U-shaped bellows cover 14 which is U-shaped in section that follows a rising and lowering movement of the rising and lowering section 4 is installed.

A guide 80 is attached to the feed mechanism section 25. The guide 80 hangs down by an own weight inside the storage section 22 from a tip position where the guide 80 is fixed to the feed mechanism section 25 through an opposite side of the second piece string 52 with the first piece string 51 between the guide 80 and the second piece string 52. Thereby, the guide 80 guides first pieces 53 that move between the feed mechanism section 25 and the storage section 22 in an outside of the first pieces 53. Further, the guide 80 defines an outermost contour of a region for movement of the first pieces 53 that move between the feed mechanism section 25 and the storage section 22. Details of the guide 80 will be described later.

The third joint J3 is provided by the linear extension and retraction mechanism. The linear extension and retraction mechanism includes a structure that is newly developed by the inventors, and is clearly distinguished from a so-called conventional linear joint from a viewpoint of a movable range. Although the arm section 5 of the third joint J3 is bendable, bend of the arm section 5 is restricted when the arm section 5 is fed forward from the feed mechanism section 25 at a root of the arm section 5 along a center axis (extension and retraction center axis RA3), and linear rigidity is secured. Bend of the arm section 5 is restored when the arm section 5 is pulled backward. The arm section 5 has the first piece string 51 and the second piece string 52. The first piece string 51 includes a plurality of first pieces 53 which are bendably connected to one another. The first piece 53 is formed into a substantially flat plate shape. The first pieces 53 are bendably connected at hinge portions in end spots. The second piece string 52 includes a plurality of second pieces 54. The second piece 54 is formed into a groove frame shaped body having a U-shape in cross section or a cylindrical body having a square shape in cross section. The second pieces 54 are bendably connected to one another at hinge portions at bottom plate end spots. Bend of the second piece string 52 is restricted in a position where end surfaces of side plates of the second pieces 54 abut on one another. In that position, the second piece string 52 is arranged linearly. The first piece 53 at a head of the first piece string 51 and the second piece 54 at a head of the second piece string 52 are connected by a head piece 55. For example, the head piece 55 has a shape obtained by combining the first piece 53 and the second piece 54.

The first and the second piece strings 51 and 52 are pressed by a roller 59 to overlap each other when passing through the roller unit 58 of the feed mechanism section 25. By overlapping, the first and the second piece strings 51 and 52 exhibit linear rigidity, and configure the columnar arm section 5. The drive gear 56 is disposed with the guide roller 57 behind the roller unit 58. The drive gear 56 is connected to a motor unit not illustrated. A linear gear is formed along a connecting direction in a width center of an inner surface of the first piece 53, that is, a surface on a side where the first piece 53 overlaps the second piece 54. When the plurality of first pieces 53 are linearly aligned, adjacent linear gears are connected linearly and configure a long linear gear. The drive gear 56 is meshed with the linear gear of the first piece 53 which is pressed by the guide roller 57. The linear gears connected linearly configure a rack-and-pinion mechanism with the drive gear 56. When the drive gear 56 rotates forward, the first and the second piece strings 51 and 52 are fed forward from the roller unit 58. When the drive gear 56 rotates reversely, the first and the second piece strings 51 and 52 are pulled back to behind the roller unit 58. The first and the second piece strings 51 and 52 which are pulled back are separated from each other between the roller unit 58 and the drive gear 56. The first and the second piece strings 51 and 52 which are separated respectively returns to a bendable state. The first and the second piece strings 51 and 52 which return to a bendable state both bends in the same direction (inward), and are stored vertically inside the support column section 2. At this time, the first piece string 51 is stored in a state substantially aligning substantially parallel to the second piece string 52.

The wrist section 6 is mounted to the tip of the arm section 5. The wrist section 6 is equipped with a fourth to a sixth joints J4 to J6. The fourth to the sixth joints J4 to J6 respectively include orthogonal three axes of axes of rotation RA4 to RA6. The fourth joint J4 is a torsional rotation joint with the fourth axis of rotation RA4, as a center, which substantially corresponds to the extension and retraction center axes RA3, and an end effector is swingably rotated by rotation of the fourth joint J4. The fifth joint J5 is a bending rotation joint with the fifth axis of rotation RA5, as a center, which is disposed perpendicularly to the fourth axis of rotation RA4, and the end effector is tiltably rotated back and forth by rotation of the fifth joint J5. The sixth joint J6 is a torsional rotation joint with the sixth axis of rotation RA6, as a center, which is disposed perpendicularly to the fourth axis of rotation RA4 and the fifth axis of rotation RA5, and the end effector is axially rotated by rotation of the sixth joint J6.

The end effector (terminal effector) is mounted to an adapter 7 provided at a lower part of a rotating section of the sixth joint J6 of the wrist section 6. The end effector is a section having a function of the robot directly working an object to be worked (work), and various tools are present in accordance with tasks, such as a grasping section, a vacuum suction section, a nut fastening tool, a welding gun, and a spray gun. The end effector is moved to an arbitrary position by the first, second, and third joints J1, J2 and J3, and is disposed in an arbitrary posture by the fourth, fifth and sixth joints J4, J5 and J6. In particular, a length of an extension and retraction distance of the arm section 5 of the third joint J3 enables the end effector to reach objects in a wide range from a position close to the base 1 to a position far from the base 1. The third joint J3 is a characteristic point different from the conventional linear joint in the linear extension and retraction operation and the length of the extension and retraction distance which are realized by the linear extension and retraction mechanism that configures the third joint J3.

Figure 5A:
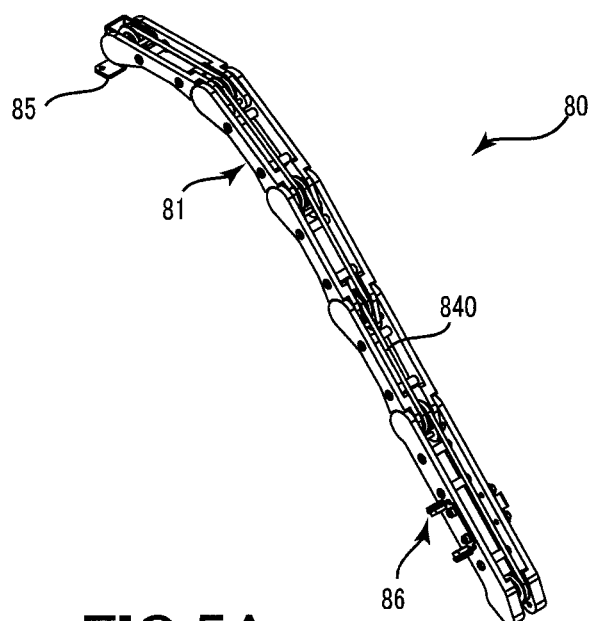
FIGS. 5A, 5B and 5C are views illustrating a structure of a guide in FIG. 3.
Figure 5B:
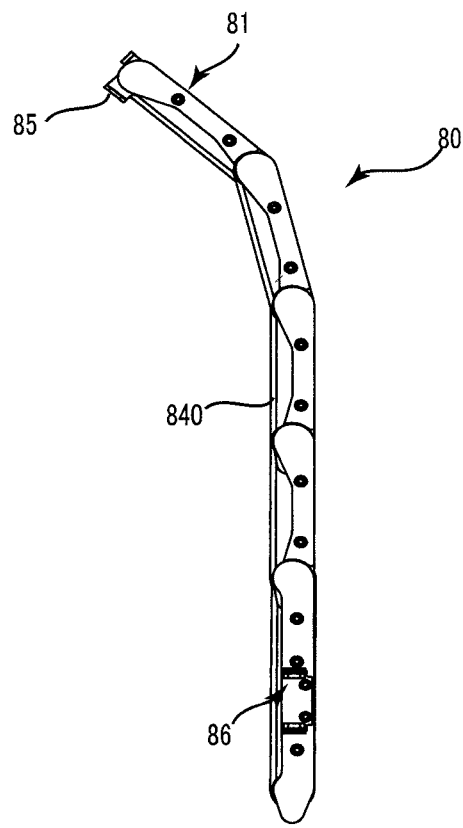
Figure 5C:
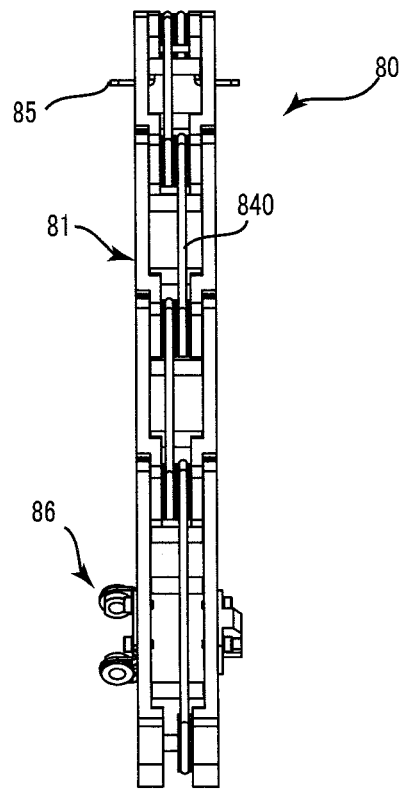
Figure 6:
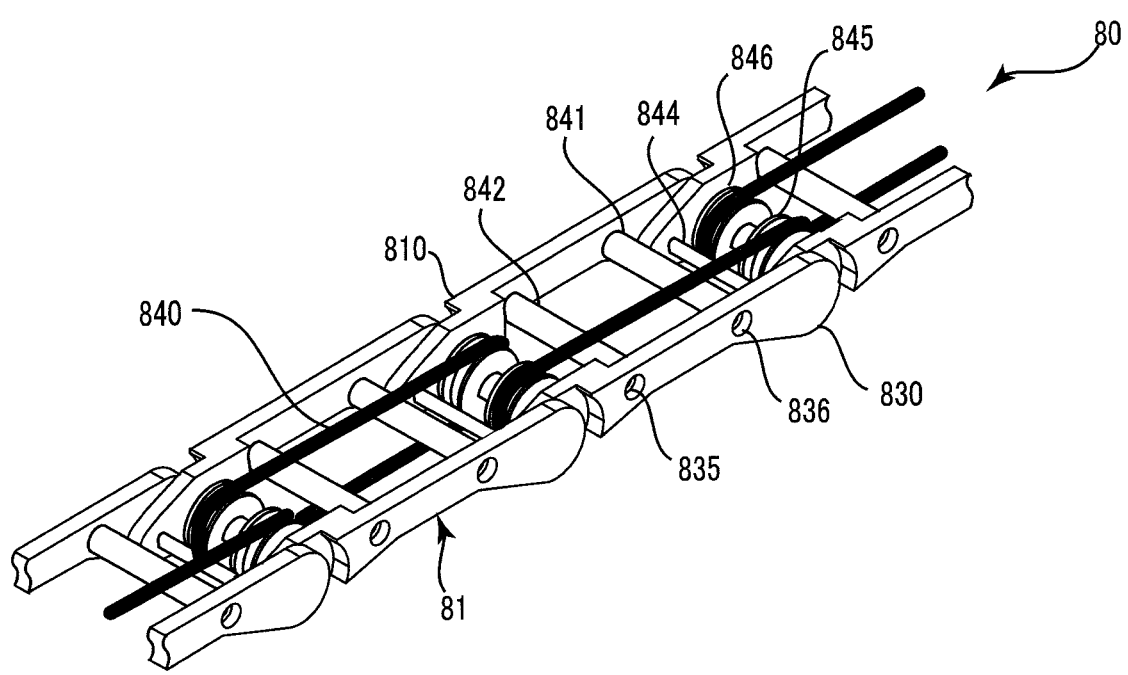
FIG. 6 is a view illustrating a structure of a guide piece in FIGS. 5A, 5B and 5C.
Figure 7:
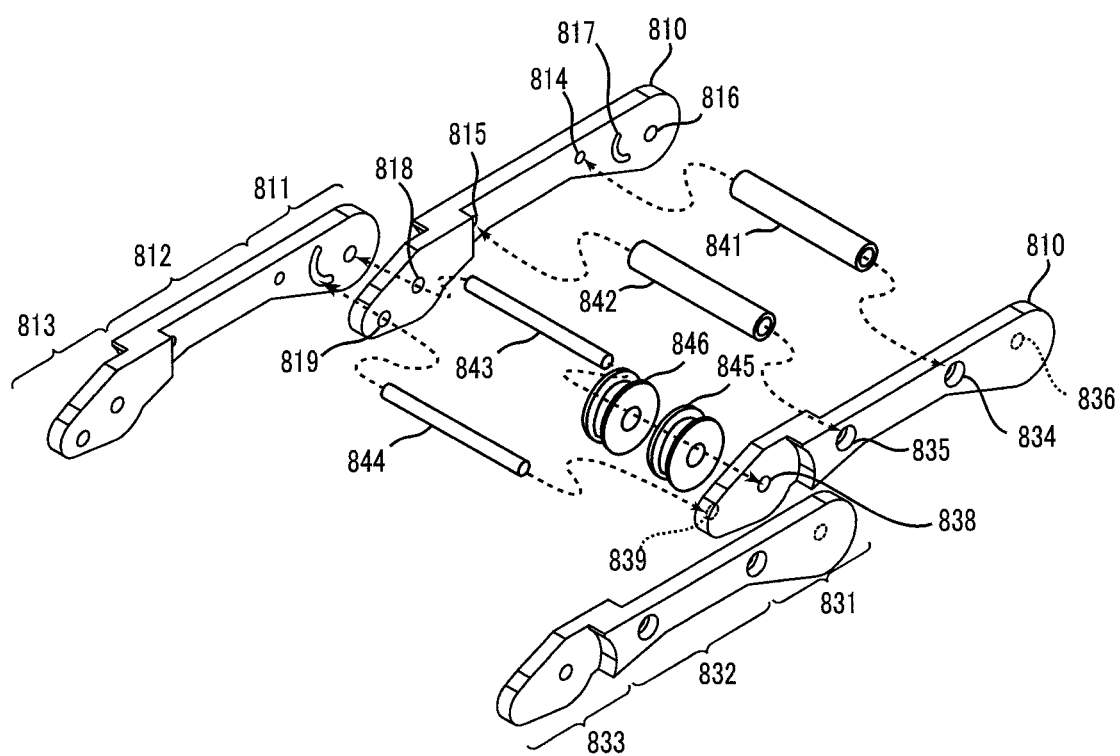
FIG. 7 is an assembly diagram of the guide piece in FIG. 6.

FIGS. 5A, 5B and 5C are views illustrating a structure of the guide 80 in FIG. 3. FIG. 6 is a perspective view illustrating a structure of a guide piece 81 in FIGS. 5A, 5B and 5C. FIG. 7 is an assembly diagram of the guide piece 81 in FIGS. 5A, 5B and 5C. The guide 80 has a plurality of guide pieces 81. The plurality of guide pieces 81 are bendably connected in mutual front and rear end portions. Thereby, the guide 80 can change a shape of the guide 80 in accordance with the rising and lowering movement of the rising and lowering section 4.

A length of the guide piece 81 influences a change of the shape of the guide 80. As the guide piece 81 is shorter, a number of bend points per unit length increases, so that the guide piece 81 can be deformed into a more complicated shape. On the other hand, increase in the number of bend points per unit length increases a risk of the first pieces 53 being caught by the bend points of the guide 80 when the first pieces 53 collide with the guide 80, and makes it difficult to deform the guide 80 into a predetermined shape. Therefore, the guide piece 81 should be formed to have an appropriate length. The guide 80 guides the first pieces 53 from outside the first pieces 53. Therefore, the guide piece 81 is typically formed to have a length substantially equivalent to or slightly longer than the length of the first piece 53. However, this does not deny that the guide piece 81 is formed to be shorter than the first piece 53. A width of the guide piece 81 is typically substantially equivalent to a width of the first piece 53.

The guide piece 81 has a pair of rectangular frames 810 and 830. The pair of frames 810 and 830 are respectively formed in same shapes and in same sizes. Note that in a state where the guide 80 is fitted to the feed mechanism section 25, edges of the frames 810 and 830 that face a first piece 53 side will be referred to as "inner edges", and edges at an opposite side of the inner edges will be referred to as "outer edges". Further, the first piece 53 side of the guide 80 will be referred to as an "inner side", and an opposite side to the inner side will be referred to as an "outer side".

The frames 810 and 830 are main components that determines the shape of the guide piece 81, and are composed of main body portions 812 and 832 in a frame center, front connection portions 811 and 831 in a frame front part, and rear connection portions 813 and 833 in a frame rear part. The front connection portions 811 and 831, the main body portions 812 and 832, and the rear connection portions 813 and 833 are formed to have same thicknesses. The outer edges of the frames 810 and 830 are formed into linear shapes, and the inner edges are formed into bow shapes in which widths become narrower toward the main body portions 812 and 832 in the centers. A shape of the frame inner edge exposes a belt 840 that will be described later from the frame inner edge.

The pair of frames 810 and 830 are connected parallel to each other by spacers 841 and 842. More specifically, two screw holes 814 and 815 that penetrate in a thickness direction are opened in the main body portion 812 of the one frame 810. In the main body portion 832 of the other frame 830, two screw holes 834 and 835 that penetrate in a thickness direction are formed in same positions as positions of the two screw holes 814 and 815 of the one frame 810 respectively. The pair of frames 810 and 830 are connected by the first and the second spacers 841 and 842. The first and the second spacers 841 and 842 are elongated circular column bodies, and lengths of the first and the second spacers 841 and 842 are typically substantially equivalent to the width of the first piece 53. The first spacer 841 has one end of the first spacer 841 fastened by a screw in a position of the screw hole 814 in a front part of the one frame 810, and has the other end fastened by a screw in a position of the screw hole 834 in the front part of the other frame 830. Likewise, the second spacer 842 has one end of the second spacer 842 fastened by a screw in a position of the screw hole 815 in a rear part of the one frame 810, and the other end fastened by a screw in a position of the screw hole 835 in the rear part of the other frame 830. Thereby, the pair of frames 810 and 830 are connected to each other parallel to each other in a state where the pair of frames 810 and 830 are spaced from each other at a fixed distance, typically, a distance substantially equivalent to the width of the first piece 53. Surfaces on a side where the pair of frames 810 and 830 face each other will be referred to as "back surfaces" of the frames, and surfaces on opposite sides of the back surfaces will be referred to as "front surfaces". Side surfaces of the guide 80 correspond to the front surfaces of the frames.

In the frames 810 and 830, the front surfaces are flat from the front connection portions 811 and 831 through the main body portions 812 and 832, and steps each with a depth substantially equivalent to the thickness of the main body portions 812 and 832 are provided from the main body portions 812 and 832 to the rear connection portions 813 and 833. Thereby, in a state where the rear connection portions 813 and 833 of the pair of frames 810 and 830 are inserted in insides of the front connection portions 811 and 831 of the other pair of frames 810 and 830 respectively, the front surfaces of the pair of frames 810 and 830 and the front surfaces of the other pair of frames 810 and 830 can be made flat, that is, the side surfaces of the guide 80 can be made flat surfaces.

In a position where the rear connection portions 813 and 833 of a pair of front frames 810 and 830 and the front connection portions 811 and 831 of a pair of rear frames 810 and 830 overlap one another, the pairs of front and rear frames 810 and 830 are bendably connected to each other by the shaft 843. More specifically, shaft receiving portions 816 and 836 are formed on the back surfaces of the front connection portions 811 and 831 of the pair of frames 810 and 830. The shaft receiving portion 816 is a shallow recess having a same sectional shape as the shaft 843. Further, in the rear connection portions 813 and 833 of the pair of frames 810 and 830, shaft holes 818 and 838 that penetrate in the thickness direction are opened respectively. In a state where the rear connection portions 813 and 833 of the pair of front frames 810 and 830 are inserted to insides of the front connection portions 811 and 831 of the pair of rear frames 810 and 830, and the shaft holes 818 and 838 of the pair of front frames 810 and 830 and the shaft receiving portions 816 and 836 of the pair of rear frames 810 and 830 are disposed in a straight line, the shaft 843 is suspended from a bottom surface of the shaft receiving portion 816 of the one frame 810 to a bottom surface of a shaft receiving portion 836 of the other frame 830 through the shaft holes 818 and 838. Thereby, the front and rear guide pieces 81 are connected bendably with the shaft 843 as a center. Note that in order to reduce friction between the shaft 843 and inner walls of the respective shaft holes 818 and 838, bearings may be mounted to the inner walls of the respective shaft holes 818 and 838. Although the shaft 843 is not fixed to the respective pairs of front and rear frames 810 and 830, a connection state of the front and rear guide pieces 81 is kept by the shaft 843, as long as the pair of frames 810 and 830 are held in a state separated by the fixed distance by the spacers 841 and 842.

A bend angle of the guide piece 81 can be restricted by a stopper mechanism fitted to an end portion of the guide piece 81. The bend angle of the guide piece 81 in this case is a rotation angle around the shaft 843, of the front guide piece 81 to the rear guide piece 81. For example, the bend angle of the guide piece 81 is zero degrees in a state where the two front and rear guide pieces 81 are linearly aligned. The bend angle of the guide piece 81 is 90 degrees in a state where the front guide piece 81 is bent to an outer edge side of the frame perpendicularly to the rear guide piece 81, and the bend angle of the guide piece 81 is −90 degrees in a state where the front guide piece 81 is bent to an inner edge side of the frame perpendicularly to the rear guide piece 81.

The stopper mechanism has an abutment pin 844 and a slit 817. The slit 817 is provided on the back surface of the front connection portion 811 of the one frame 810. The slit 817 is formed into an arc shape with a center axis of the shaft receiving portion 816 as a center. In the rear connection portion 813 of the one frame 810, a pin hole 819 that penetrates in a thickness direction is opened. In the rear connection portion 833 of the other frame 830, a non-penetrating pin receiving portion 839 is formed. In a state where the rear connection portions 813 and 833 of the pair of front frames 810 and 830 are inserted to insides of the front connection portions 811 and 831 of the pair of rear frames 810 and 830, and the pin hole 819 and the pin receiving portion 839 of the pair of front frames 810 and 830, and the slit 817 of the pair of rear frames 810 and 830 are disposed in a straight line, the abutment pin 844 is suspended from a bottom surface of the pin receiving portion 839 to a bottom surface of the slit 817 through the pin hole 819. The abutment pin 844 moves in the slit 817 in accordance with a bending operation of the guide piece 81. In a position where the abutment pin 844 abuts on an end portion at a frame outer edge side, of the slit 817, bend to outside, of the guide piece 81 is restricted. In a position where the abutment pin 844 abuts on an end portion at a frame inner edge side, of the slit 817, bend to an inside, of the guide piece 81 is restricted. Accordingly, by adjusting both end positions of the slit 817, limit angles of the bend angles to outside and inside, of the guide piece 81 can be changed. Although the abutment pin 844 is not fixed to the respective pairs of front and rear frames 810 and 830 either, the abutment pin 844 does not remove from the pin receiving portion 839 and the slit 817, as long as the pair of frames 810 and 830 are held in the state separated by a fixed distance by the spacers 841 and 842.

In order to reduce a possibility of damaging the first pieces 53 due to collision of the first pieces 53 with the guide 80, the guide 80 is equipped with a member having flexibility on a side facing the first pieces 53. Here, a belt 840 having flexibility is laid between the adjacent guide pieces 81. Consequently, two pulleys 845 and 846 are interposed between a pair of frames 810 and 830 of the guide piece 81. The two pulleys 845 and 846 are pivotally supported by the shaft 843 that bendably connects the front and rear guide pieces 81. Diameters of the pulleys 845 and 846 are longer than widths of the frame main body portions 812 and 832, and typically are equivalent to maximum widths of the frames 810 and 830 or slightly shorter than the maximum widths of the frames 810 and 830. From the leading guide piece 81 to the tail guide piece 81 of the plurality of guide pieces 81, the belt 840 is alternately laid on the pulleys 845 and 846. For example, the belt 840 having flexibility is laid on the pulley 845 at one side of the guide piece 81 and the pulley 845 at one side of the rear guide piece 81, and the belt 840 having flexibility is laid on the pulley 846 at the other side of the guide piece 81 and the pulley 846 at the other side of the front guide piece 81. The bow shapes of the inner edges of the frames 810 and 830 cause the belt 840 to protrude inward with respect to the inner edges of the frames 810 and 830. Thereby, even when the first pieces 53 collide with the guide 80, an impact of the collision can be reduced by the belt 840, and the possibility of damaging the first pieces 53 can be reduced as compared with the case where the belt 840 having flexibility is not installed. Note that since the belt 840 is laid on the pulleys 845 and 846, a state in which the first piece 53 is caught by the belt 840 can be avoided by rotation of the pulleys 845 and 846.

The leading guide piece 81 of the plurality of guide pieces 81 is equipped with an adapter 85. The guide 80 is fixed to the feed mechanism section 25 at the rotation side of the rising and lowering rotation joint J2 via the adapter 85. The guide 80 which is fixed to the feed mechanism section 25 is suspended by the own weight to inside of the storage section 22, by passing through an opposite side to the second piece string 52 with the first piece string 51 between the guide 80 and the second piece string 52, from the feed mechanism section 25. The guide 80 guides the first pieces 53 that move between the feed mechanism section 25 and the storage section 22, in an outside of the first pieces 53.

The guide 80 is suspended into the storage section 22 from the feed mechanism section 25, and movement of a rear end of the guide 80 is restricted to a vertical direction of the support column section 2 by engaging the rear end of the guide 80 with a linear slide mechanism. The linear slide mechanism realizes suppression of swing of the guide 80, and avoidance of collision of the guide 80 with surroundings. The linear slide mechanism includes a slider 86 and a linear rail 221. For example, the slider 86 is installed by a ring runner, and the linear rail 221 is installed by a poll, respectively. The slider 86 linearly reciprocates along the linear rail 221. The slider 86 is mounted to the guide piece 81 at a tail end. The linear rail 221 is installed inside the storage section 22 to be parallel to a center axis of the storage section 22.

Figure 8A:
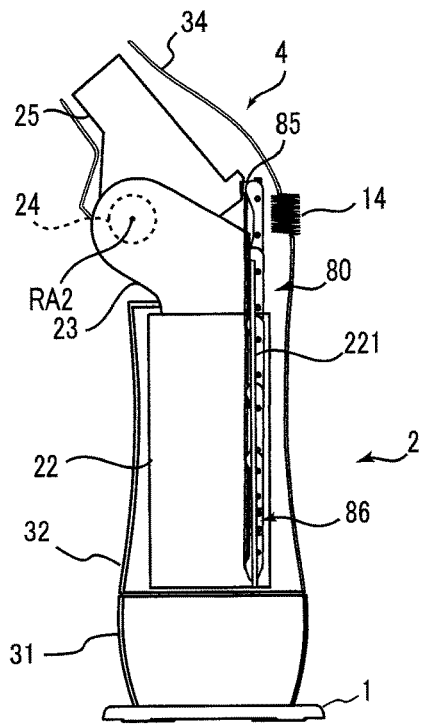
FIGS. 8A, 8B and 8C are supplementary explanatory views for explaining an operation of the guide in FIG. 5.
Figure 8B:
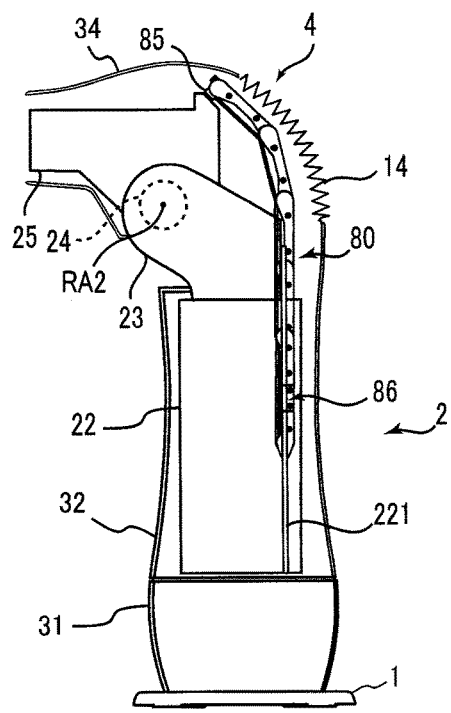
Figure 8C:
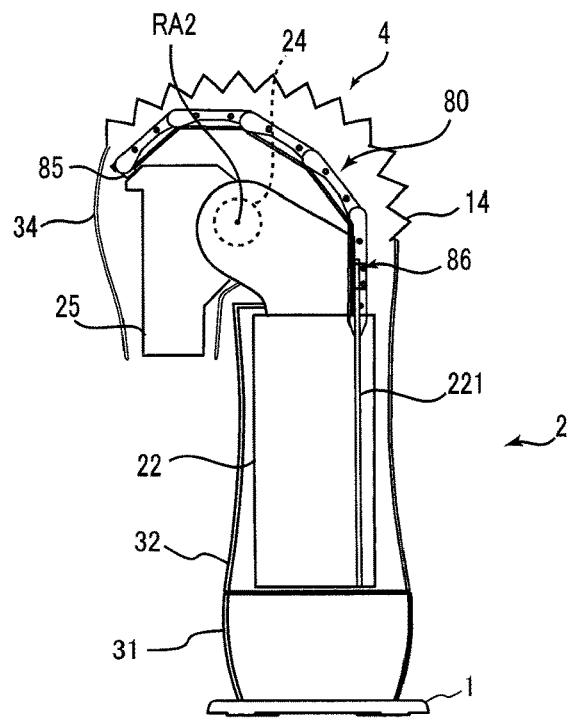

FIGS. 8A, 8B and 8C are explanatory views for explaining an operation of the guide 80 that follows rising and lowering movement of the rising and lowering rotation joint J2. FIG. 8A illustrates a shape of the guide 80 at a time of the rising and lowering section 4 being in a most raised posture (at a time of a rising and lowering angle of zero degrees). FIG. 8B illustrates a shape of the guide 80 at a time of a horizontal posture of the robot arm mechanism. FIG. 8C illustrates a shape of the guide 80 at a time of the rising and lowering section 4 being in a most lowered posture (at a time of the rising and lowering angle being maximum).

When the rising and lowering section 4 is in the most raised posture, the guide 80 forms a substantially linear shape. At this time, a rear portion of the guide 80 is stored inside the storage section 22 along the poll 221. When the rising and lowering section 4 is in the horizontal posture, a front portion of the guide 80 forms a substantially arc shape with the axis of rotation RA2 as the center, and a rear portion forms a substantially linear shape. When the rising and lowering section 4 is in the most lowered posture, the guide 80 forms a substantially arc shape with the axis of rotation RA2 as a center. In accordance with the rising and lowering movement of the rising and lowering section 4, the guide 80 gradually deforms from the substantially linear shape to the substantially circular arc shape.

When the posture of the rising and lowering section 4 changes from the most raised posture to the most lowered posture, the feed mechanism section 25 rotates a predetermined angle around the axis of rising and lowering rotation RA2. In a process of the rotation, the guide 80 is pulled around the axis of rising and lowering rotation RA2 by the feed mechanism section 25, and the rear portion of the guide 80 is gradually pulled out of the storage section 22, and the guide 80 moves along the circular arc with the axis of rising and lowering rotation RA2 as the center while gradually bending the guide pieces 81 to inside in order from the leading guide piece 81. The bend angle of the guide piece 81 is restricted so that the guide 80 moves along the circular arc with the axis of rising and lowering rotation RA2 as the center.

More specifically, a length and position of the slit 817 of each of the plurality of guide pieces 81 are adjusted so that the limit angle at which the guide 80 bends outward is zero or an approximate value of zero. Thereby, the guide piece 81 is unable to bend outward with respect to the rear guide piece 81, so that bend to outside of an intermediate portion of the guide 80 can be avoided, and the entire guide 80 can be deformed in a shape which is determined in advance.

Further, positions of both ends of the slit 817 of each of the plurality of guide pieces 81 are adjusted, so that the limit angle at which the guide 80 bends inward is an acute angle. The bend angle to inside of the guide 80 can be roughly set in accordance with what amount of portion around the axis of rotation RA2 needs to be covered by how many guide pieces 81. For example, when the guide 80 covers a half circle portion with the axis of rotation RA2 as the center between the feed mechanism section 25 and the storage section 22 with five guide pieces 81 when the rising and lowering section 4 is in the most lowered posture illustrated in FIG. 8C, the inward bend angle of the guide piece 81 is restricted to approximately 36 degrees. Thereby, the guide 80 can deform into the circular arc shape with the axis of rotation RA2 as the center without deforming into a distorted circular arc shape in which the intermediate portion is significantly bent inward.

The guide 80 bends in a restricted angle range by restricting the bend angle of the guide pieces 81 in this way, so that when the guide 80 deforms from the linear state to the circular arc shape (or an arch shape) with the rising and lowering movement, a gradual circular arc shape (or arch shape) can be drawn from the feed mechanism section 25 to the storage section 22 by restricting a maximum value of a curvature of the circular arc. In a part between the feed mechanism section 25 and the storage section 22, deforming the guide 80 into the circular arc shape with the axis of rotation RA2 as the center contributes to smooth feeding out/pulling back of the first pieces 53 by the guide 80.

Note that to the robot arm mechanism according to the present embodiment, an urging mechanism that urges the guide 80 to a lower part of the storage section 22 may be added. In the structure in which the guide 80 is suspended downward by the own weight, the guide 80 winds and is entangled to inhibit movement of the pieces 53 and 54, for example, when the support column section 2 is suspended from a ceiling, or is installed to protrude horizontally from a side wall, and the urging mechanism avoid the situation like this, and can increase a degree of freedom of installation.

Figure 9:
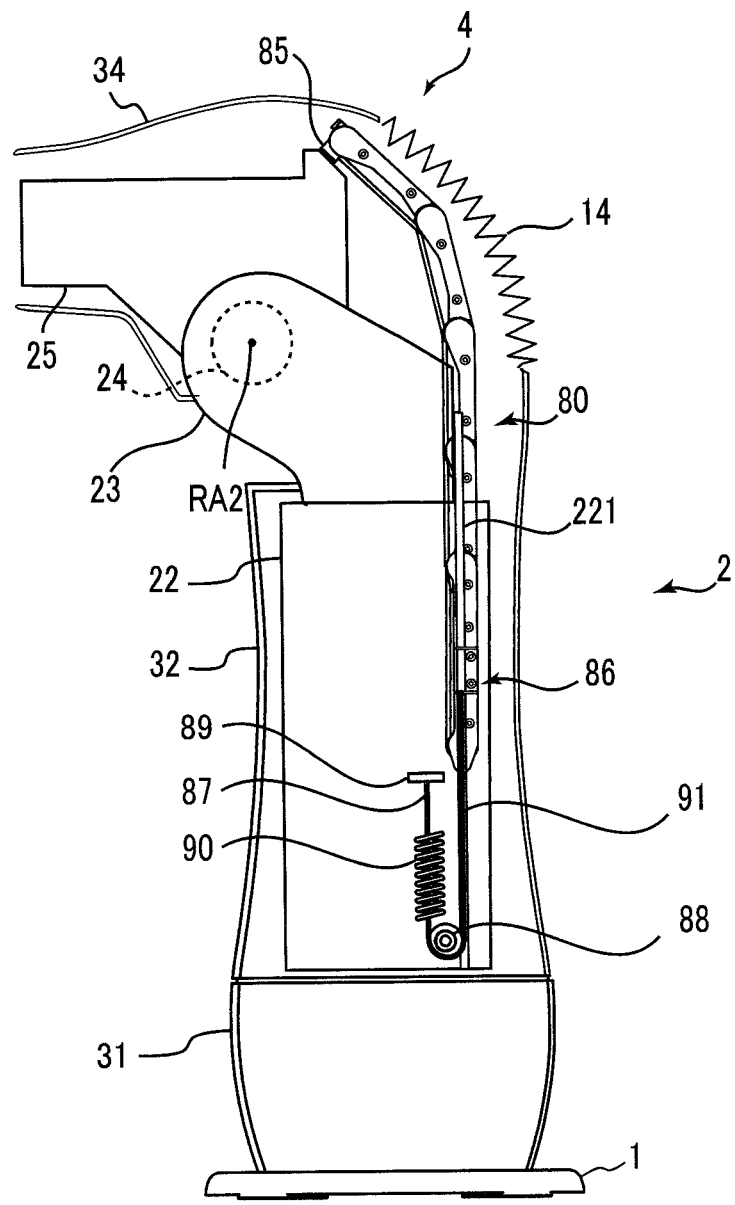
FIG. 9 is a view illustrating a configuration example in which an urging mechanism for urging the guide in FIG. 5 downward is added.
Figure 10:
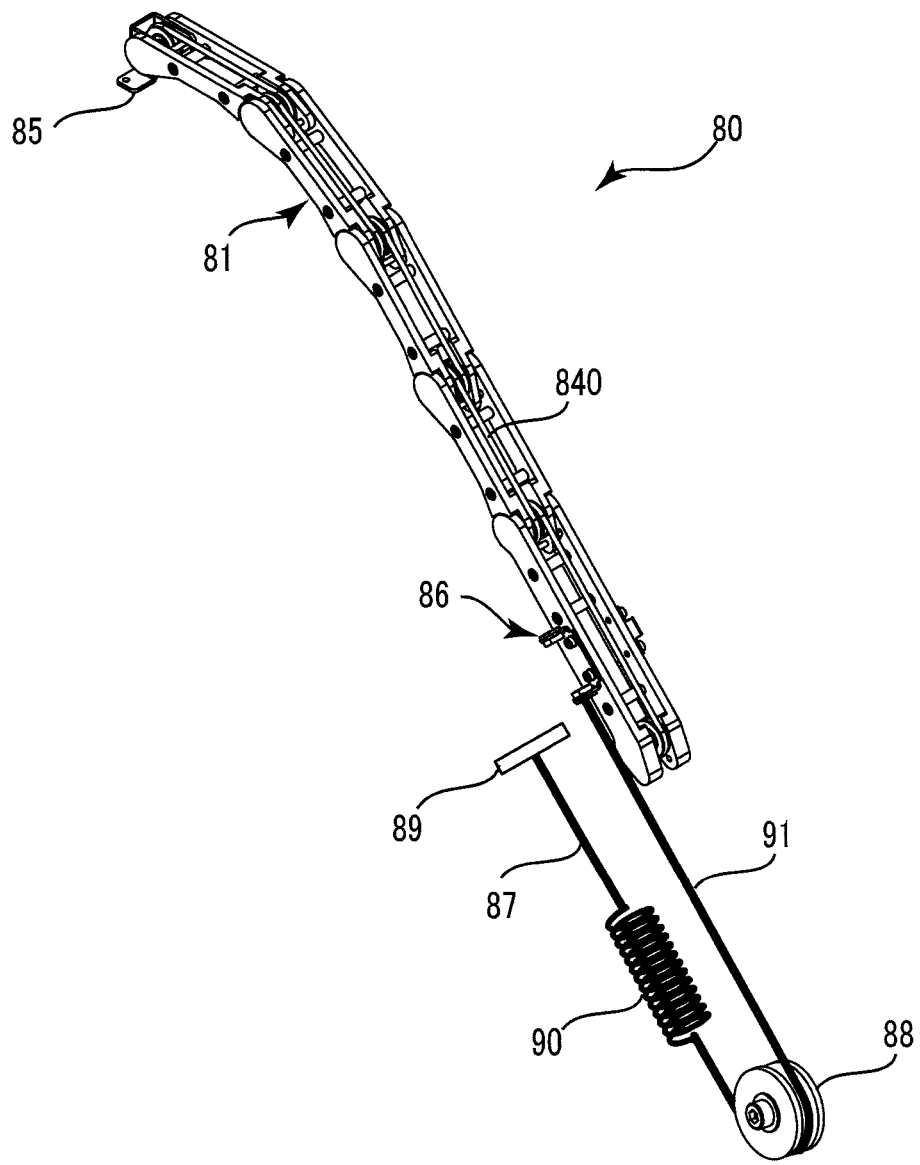
FIG. 10 is a view illustrating an example of the urging mechanism in FIG. 9.

As illustrated in FIGS. 9 and 10, an urging force of the urging mechanism is generated by, for example, a tensile coil spring 90. A cable 91 is connected to a tip of the coil spring 90. The cable 91 is connected to the guide piece 81 at the tail end via a pulley 88 at a lower end of the storage section 22. A rear end of the tension spring 90 is fixed by a cable fixing tool 89 in about a middle in the storage section 22 via a cable 87. Adoption of the pulley 88 can avoid the situation in which a lowermost position of the guide 80 is restricted.

Note that the urging force of the urging mechanism is not limited to the force that is generated by the coil spring 90. An expansible cable of a rubber or the like may be adopted. Further, a structure may be adopted, in which a rear end of the cable 91 is connected to a cable bobbin including a torsion spring.

While certain embodiments have been described, these embodiments have been presented by way of example only, and are not intended to limit the scope of the inventions.

Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

REFERENCE SIGNS LIST

1 . . . Base, 2 . . . Support column section, 4 . . . Rising and lowering section, 6 . . . Wrist section, 7 . . . Adapter, 14 . . . Cover, 22 . . . Storage section (support column upper frame), 23 . . . Side frame, 24 . . . Cylindrical body, 25 . . . Feed mechanism, 31, 32, 33, 34 . . . Housing, 51 . . . First piece string, 52 . . . Second piece string, 53 . . . First piece, 54 . . . Second piece, 55 . . . Head section (head piece), 56 . . . Drive gear, 57 . . . Guide roller, 58 . . . Roller unit, 59 . . . Roller, 80 . . . Guide, 86 . . . Ring runner, 221 . . . Pole

The invention claimed is:

1. A robot arm mechanism in which a support column section is supported by a base, a rising and lowering section including a rising and lowering rotation joint is placed on the support column section, and a linear extension and retraction mechanism including an arm with linear extension and retraction properties is provided in the rising and lowering section, the robot arm mechanism comprising:
a plurality of first pieces each in a flat plate shape that are bendably connected;
a plurality of second pieces each in a groove frame shape that are bendably connected;
a head section that connects a head of the first pieces and a head of the second pieces;
a feed mechanism section that supports the first and second pieces movably forward and backward;
a storage section that is installed in the support column section, and stores the first pieces and the second pieces; and
a guide that guides reciprocating movement of the first pieces between the feed mechanism and the storage section from outside of the first pieces,
wherein when the arm extends forward, the first and the second pieces are pulled out to the feed mechanism section from the storage section and are overlapped with each other in the feed mechanism section to configure the arm rigidly, and when the arm retracts, the first and the second pieces are pulled back to behind the feed mechanism section and are separated from each other to be returned, in a bending state, to the storage section from the feed mechanism section, and
the guide includes a plurality of guide pieces bendably connected to deform in accordance with rising and lowering movement of the rising and lowering rotation joint, and hangs into the storage section from the feed mechanism to which a leading guide piece is fixed.

2. The robot arm mechanism according to claim 1, wherein a limit angle at which the guide bends inward is an acute angle.

3. The robot arm mechanism according to claim 1, wherein a limit angle at which the guide bends outward is zero or an approximate value of zero.

4. The robot arm mechanism according to claim 1, wherein the guide piece is longer than the first piece.

5. The robot arm mechanism according to claim 1,
wherein a pole is installed in the storage section to be parallel with a center axis of the storage section, and
a ring runner through which the pole is inserted is fitted to a rear portion of the guide.

6. The robot arm mechanism according to claim 1,
wherein a pulley is pivotally supported at an end portion of the guide piece coaxially with a bend axis of the guide piece, and a belt having flexibility is laid across pulleys of a plurality of guide pieces.

7. The robot arm mechanism according to claim 6, wherein the guide piece has a pair of frames connected to each other parallel with each other by a spacer, and an edge portion on a side of the first piece, of each of the pair of frames is formed into a bow shape.

8. The robot arm mechanism according to claim 1, wherein the guide hangs into the storage section from the feed mechanism by an own weight of the guide.

9. The robot arm mechanism according to claim 1, further comprising an urging mechanism that urges the guide downward in the support column section.

10. A robot arm mechanism in which a support column section is supported by a base, a rising and lowering section including a rising and lowering rotation joint is placed on the support column section, and a linear extension and retraction mechanism including an arm with linear extension and retraction properties is provided in the rising and lowering section, the robot arm mechanism comprising:
a plurality of first pieces each in a flat plate shape that are bendably connected;
a plurality of second pieces each in a groove frame shape that are bendably connected;
a head section that connects a head of the first pieces and a head of the second pieces;
a feed mechanism section that supports the first and second pieces movably forward and backward;
a storage section in a square-cylinder shape that is installed in the support column section, and stores the first pieces and the second pieces; wherein when the arm extends forward, the first and the second pieces are pulled out to the feed mechanism section from the storage section and are overlapped with each other in the feed mechanism section to configure the arm rigidly, and when the arm retracts, the first and the second pieces are pulled back to behind the feed mechanism section and are separated from each other to be returned, in a bending state, to the storage section from the feed mechanism section, and
a guide that deforms in accordance with rising and lowering movement of the rising and lowering section, and guides reciprocating movement of the first pieces between the feed mechanism and the storage section from outside of the first pieces.

* * * * *